United States Patent [19]
Matsuda

[11] Patent Number: 4,894,721
[45] Date of Patent: Jan. 16, 1990

[54] METHOD AND APPARATUS FOR SOLID STATE IMAGE PROCESSING

[75] Inventor: Hikaru Matsuda, Kanagawa, Japan

[73] Assignee: Mitsubishi Denki Kabushiki Kaisha, Tokyo, Japan

[21] Appl. No.: 169,411

[22] Filed: Mar. 17, 1988

[30] Foreign Application Priority Data

Mar. 19, 1987 [JP] Japan .................................. 62-64959

[51] Int. Cl.$^4$ ........................................... H04N 5/217
[52] U.S. Cl. ................................ 358/213.17; 358/163
[58] Field of Search .................. 358/167, 213.17, 163, 358/213.15, 213.11

[56] References Cited

U.S. PATENT DOCUMENTS

| | | | |
|---|---|---|---|
| 3,919,473 | 11/1975 | Cotter ................................. | 358/163 |
| 4,326,219 | 4/1982 | Griesshaber ....................... | 358/163 |
| 4,343,021 | 8/1982 | Frame ................................. | 358/163 |
| 4,473,845 | 9/1984 | Davy ................................... | 358/163 |
| 4,517,600 | 5/1985 | Reitmeier .......................... | 358/167 |
| 4,590,520 | 5/1986 | Frame et al. ...................... | 358/213.17 |
| 4,710,817 | 12/1987 | Ando ................................. | 358/213.11 |
| 4,739,495 | 9/1988 | Levine .............................. | 358/213.15 |

OTHER PUBLICATIONS

Nudd, G. R., "Image Understanding Architectures", National Computer Congress, 1980 (pp. 377–390).
Japanese Patent Public Disclosure No. 124628/79.
Japanese Patent Public Disclosure No. 121578/86.

Primary Examiner—Jin F. Ng
Assistant Examiner—Stephen Brinich
Attorney, Agent, or Firm—Wolf, Greenfield & Sacks

[57] ABSTRACT

A solid state imaging device is disclosed which includes a solid state sensor for converting an external scene into electrical signals, an A/D converter for converting output signals from the solid state sensor into digital signals, a frame memory for storing offset signals of the solid state sensor, and an arithmetic unit for subtracting the offset signals stored in the frame memory from the digital signals of the A/D converter, the signals from the arithmetic unit being output through a D/A converter and a synchronization adding circuit. In the thus constituted solid state imaging device, a judgement as to the level of the offset signal from the frame memory is made. If this level is lower than a predetermined value, it is judged that there is a defective pixel. Interpolation is then effected with neighboring peripheral pixel signals in a spatial processor.

6 Claims, 2 Drawing Sheets

METHOD AND APPARATUS FOR SOLID STATE IMAGE PROCESSING

BACKGROUND OF THE INVENTION

1. Field of the Invention

The present invention relates to a solid state imaging device which utilizes a solid state sensor having a substantial number of pixels (picture elements).

2. Description of the Prior Art

FIG. 2 illustrates a block diagram of an example of a prior art solid state imaging device. In FIG. 2, the reference numeral 1 designates a solid state sensor for imaging an external scene; 2 denotes an A/D converter for converting analog image output signals of the solid state sensor 1 into digital signals; 3 represents a frame memory for storing offset signals of the solid state sensor; 4 denotes an arithmetic unit for subtracting the offset signals of the frame memory 3 from the output digital signals of the A/D converter 2 during a normal operation; and 5 stands for a D/A converter/synchronization circuit for converting the outputs of the arithmetic unit 4 into analog video signals and for adding the synchronizing signals.

Next, attention will be focused on the operation of the prior device. The incident light beams OP are converted into analog image signals by means of the solid state sensor 1, and the analog image signals are further converted into digital image signals by use of the A/D converter 2. The outputs of the A/D converter 2 with respect to the uniform light beams incident upon the entire picture are stored as the offset signals in the frame memory 3. The arithmetic unit serves to subtract the offset signals stored in the frame memory 3 from the outputs of the A/D converter 2 with respect to an object to be imaged during working time, thereby obtaining correction outputs. The correction outputs are transmitted to the D/A converter/synchronization adding circuit 5 which effects conversion into analog signals and multiplexing of synchronizing signals. The above-described control is performed by a timing generator 6 for creating a specific timing, in which case a clock for driving the solid state sensor is defined as the reference.

There are, however, some inherent problems in the thus constructed conventional device. In the case of an image which is so defective that a certain pixel of the solid state sensor 1 is completely dead even if the incident light beam emerges, the output of this pixel does not vary, and it follows that spots unfavourably appear on the picture. This phenomenon is an obstacle to obtaining high-quality images.

Moreover, where the above-described conventional device is employed in searching for a small body, it is likely that a mistaken target may be assumed to be the small body of interest. As a result, a solid state sensor having no defect of the kind described is required, and this demand will inevitably lead to an increase in the overall cost of the device.

SUMMARY OF THE INVENTION

It is a primary object of the present invention to provide a solid state imaging device which overcomes the above-mentioned obstacles or problems and is capable of outputting high-quality image signals even if there are defective pixels in a solid state sensor.

This and other objects are achieved by a solid state imaging device including a level detector connected to an output of the frame memory, means for detecting defective images, and spatial arithmetic means for defining compensation signals by utilizing image signals associated with neighbouring peripheral pixels and for substituting the compensation signals as image signals in a position corresponding to the defective image signals.

Other features and advantges of the invention will become apparent from the following description taken in connection with the accompanying drawings.

DESCRIPTION OF THE PREFERRED EMBODIMENT

Figure 1:
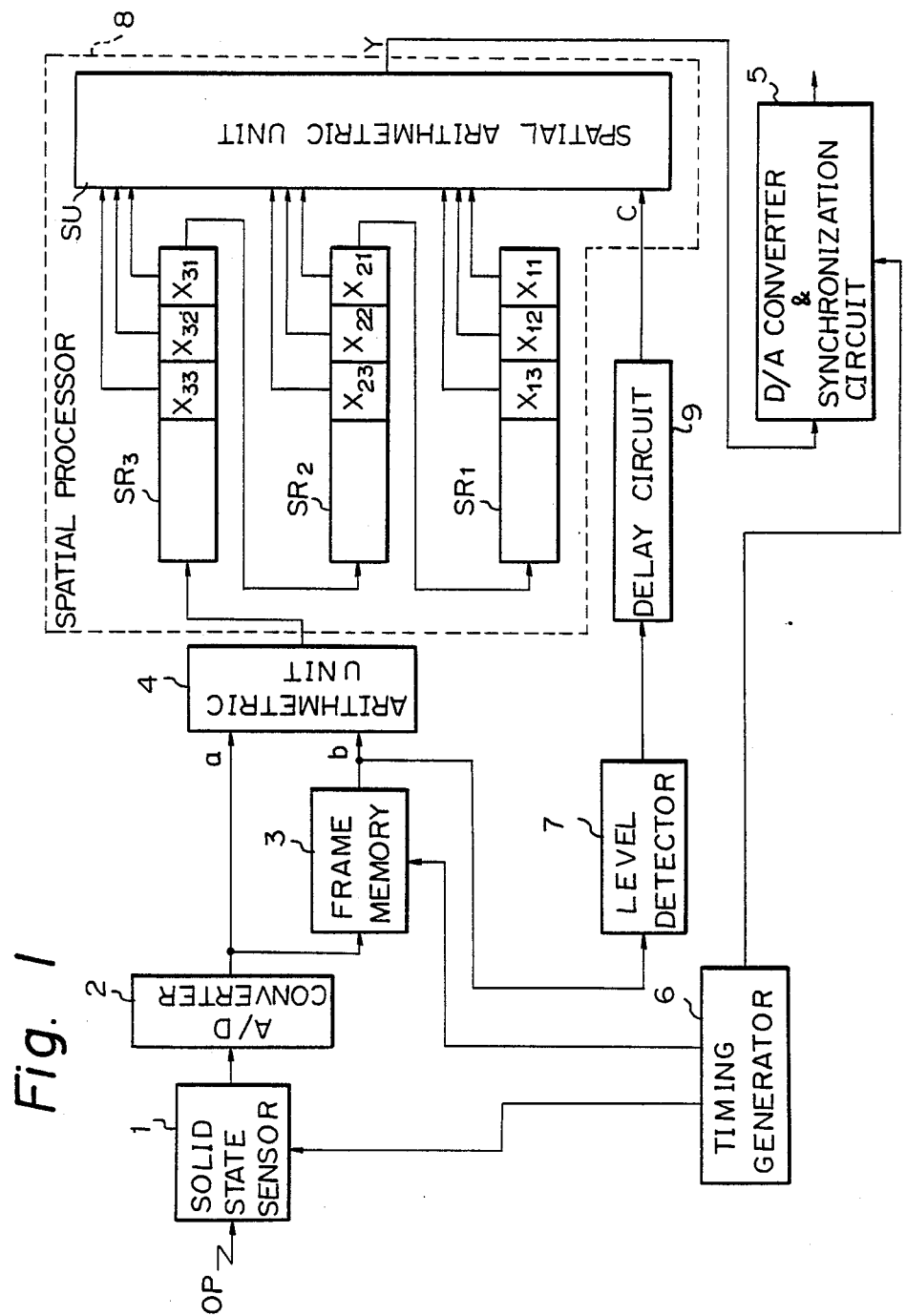
FIG. 1 is a block diagram of a solid state imaging device, illustrating one embodiment of the present invention.
Figure 2:
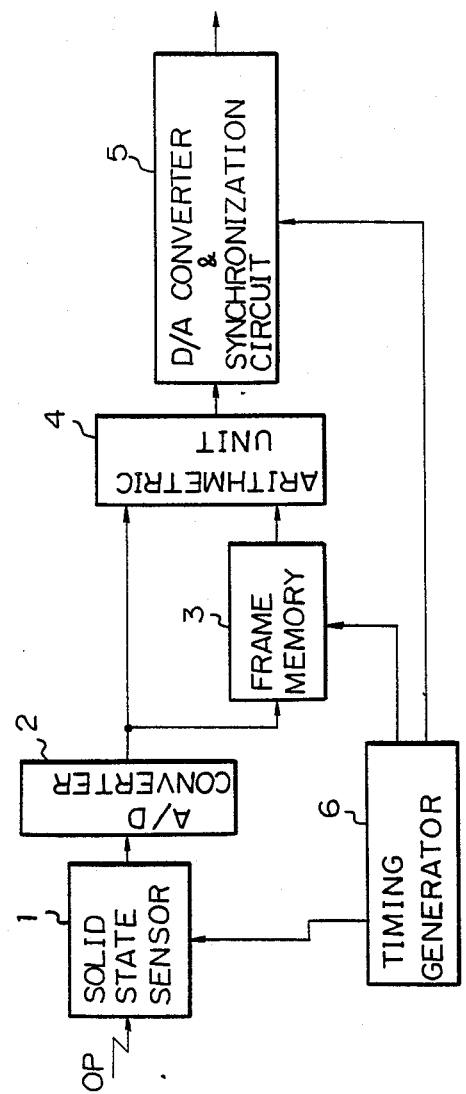
FIG. 2 is a block diagram showing one example of a prior art solid state imaging device.

Referring first to FIG. 1, a block diagram of one embodiment of the present invention is shown. In the figure, components which are the same as those depicted in FIG. 2 are marked with the same symbols. A level detector generally indicated at 7 serves to judge each level of offset signals stored in a frame memory. The numeral 8 represents a spatial processor composed of shift registers SR1 through SR3 and a spatial arithmetic circuit SU; and 9 designates a delay circuit for adjusting a given timing by delaying signals of the level detector 7.

In the thus constructed solid state imaging device, each level of the images is held by the frame memory 3, and the defective images are detected by the level detector 7 which judges the severity of the detect from the level thereof. The defective images detected are caused to be replaced by compensation signals of neighbouring peripheral pixels by means of the spatial processor 8.

An explanation will next be given relating the following formulae to FIG. 1.

Let the content stored in the frame memory 3 be b, and let the judging threshold value of the level detector 7 be $\epsilon$. Based on the relationship of magnitude between the content b and the threshold value $\epsilon$, the output C of a delay circuit 9 will be generated after a predetermined delay:

$$C=1, \text{ (when } b \geq \epsilon) \tag{1}$$

$$C=0, \text{ (when } b < \epsilon) \tag{2}$$

The spatial processor 8 executes processing as follows: signals of eight neighbouring pixels in regard to a certain pixel X22 are fetched from part of shift registers SR1, SR2 and SR3, each having a delay time corresponding to a scanning line of the image; and spatial arithmetic is effected under the condition of the formula (1), while the signal of the pixel X22 is output under the condition of the formula (2).

To formulate the output of the spatial arithmetic unit SU in spatial processor 8, let this output be Y, let the signal corresponding to the pixel X22 be x22, and similarly let the eight neighbouring signals corresponding to X11, X12, X13, X21, X23, X31, X32 and X33 of FIG. 1 be x11, x12, x13, x21, x23, x31, x32 and x33, respectively. The output Y is expressed as:

$$Y = 1/8 \, (x11+x12+x13+x21+x23+x31+x32+x33),$$
(when C=1) \hfill (3)

$$Y = x22, \text{ (when C=0)} \hfill (4)$$

Hence, at the pixel which has been judged to be defective, an average value for the eight neighbouring pixels is identified as a substitute signal. If there is no defect, the original signal is output as it is.

The above-described embodiment, as indicated by the formula (3), utilizes eight neighbouring pixels. However, the same effects can obviously be attained by performing the following processing which involves the use of four neighbouring pixels or four different neighbouring pixels. Namely, the formulae (5) and (6) which may substitute for the formula (3) are as follows:

$$Y = 1/4 \, (x12+x21+x23+x32), \text{ (when C=1)} \hfill (5)$$

$$Y = 1/4 \, (x11+x13+x31+x33), \text{ (when C=1)} \hfill (6)$$

As discussed above, the present invention provides the advantages that the signal of the defective pixels can be compensated by the signals of the neighbouring pixels, and the yield of elements of a solid state camera is thereby remarkably improved.

While the present invention has been described in detail and with reference to a specific embodiment thereof, it will be apparent to those skilled in the art that various changes and modifications can be made therein without departing from the spirit and scope thereof.

What is claimed is:

1. A method of solid state image processing comprising the steps of:
    (a) converting an external uniformly illuminated scene into reference digital signals corresponding to respective pixels;
    (b) deriving from said reference digital signals corresponding respective offset signals;
    (c) establishing a predetermined reference level;
    (d) comparing said corresponding respective offset signals with said predetermined reference level to determine defective pixels;
    (e) converting an external scene into digital signals corresponding to respective pixels;
    (f) subtracting said respective offset signals from said corresponding respective digital signals to determine an output video signal corresponding to a respective pixel;
    (g) substituting a video signal for said output video signal if said corresponding pixel is defective.

2. A method as set forth in claim 1 further comprising the steps of:
    (h) determining a defective pixel;
    (i) determining a replacement digital signal for said defective pixel by effecting interpolation with both digital signals corresponding to pixels preceding said defective pixel an digital signals corresponding to pixels succeeding said defective pixel;
    (j) substituting said replacement digital signal for said digital signal corresponding to said defective pixel.

3. A method as set forth in claim 2 wherein said step of converting an external scene into digital signals includes converting by raster scanning in multiple scan lines with the preceding pixels disposed locationwise on the raster scan line prior to the defective pixel.

4. A method as set forth in claim 3 wherein the succeeding pixels are disposed locationwise on the raster scan line after the defective pixel.

5. A method as set forth in claim 4 wherein the preceding pixels are disposed locationwise on a preceding raster scan line.

6. A method as set forth in claim 5 wherein the succeeding pixels are disposed locationwise on a succeeding raster scan line.

* * * * *